United States Patent [19]

Tsuruta

[11] Patent Number: 5,511,638
[45] Date of Patent: Apr. 30, 1996

[54] RETURN SPRING FOR A DISC BRAKE

[75] Inventor: Matsuhisa Tsuruta, Toyota, Japan

[73] Assignee: Aisin Seiki Kabushiki Kaisha, Kariya, Japan

[21] Appl. No.: 376,674

[22] Filed: Jan. 23, 1995

Related U.S. Application Data

[63] Continuation of Ser. No. 75,880, Jun. 14, 1993, abandoned.

[30] Foreign Application Priority Data

Jun. 15, 1992 [JP] Japan .................................... 4-154857

[51] Int. Cl.⁶ ........................... F16D 55/224; F16F 15/06
[52] U.S. Cl. ...................................... 188/73.38; 188/72.3
[58] Field of Search ......................... 188/72.3, 73.38, 188/73.37, 73.36

[56] References Cited

U.S. PATENT DOCUMENTS

| | | |
|---|---|---|
| 4,428,463 | 1/1984 | Burgdorf et al. |
| 4,491,204 | 1/1985 | Dirauf et al. ............... 188/73.38 |
| 4,940,119 | 7/1990 | Kondo et al. ............... 188/73.38 |
| 5,249,647 | 10/1993 | Kobayashi et al. ............ 188/72.3 |

FOREIGN PATENT DOCUMENTS

| | | |
|---|---|---|
| 2020684 | 11/1971 | Germany . |
| 3130185A1 | 4/1982 | Germany . |
| 2166822 | 5/1986 | Germany . |
| 56-28323 | 3/1981 | Japan . |
| 60-88234 | 5/1985 | Japan . |
| 0088237 | 5/1985 | Japan .................... 188/72.3 |
| 61-2826 | 1/1986 | Japan . |
| 1154578 | 6/1969 | United Kingdom . |
| 1219778 | 1/1971 | United Kingdom . |
| 1387246 | 3/1975 | United Kingdom . |
| 2178807 | 2/1987 | United Kingdom . |
| 2257483 | 1/1993 | United Kingdom . |

*Primary Examiner*—Matthew C. Graham
*Attorney, Agent, or Firm*—Oblon, Spivak, McClelland, Maier & Neustadt

[57] ABSTRACT

A disc brake for use in a vehicle comprises a mounting member for fixing the vehicle, a cylinder slidably disposed on the mounting member, a pair of disc pads each of which includes a pair of supporting portions, each of the pads supported on the mounting member at the supporting portions and a spring member which engages with each of the pads at a portion substantially on a line which connects between the supporting portions, the spring member which forces outwardly each of the pads so as to be estranged from each other.

4 Claims, 4 Drawing Sheets

RETURN SPRING FOR A DISC BRAKE

This application is a continuation of application Ser. No. 08/075,880, filed on Jun. 14, 1993, now abandoned.

BACKGROUND OF THE INVENTION

1. Field of the invention

This invention relates to a disc brake for use in a vehicle.

2. Description of the Related Art

A conventional disc brake for use in a vehicle is for example disclosed in the Japanese Utility Model No. 61(1986)-2826. The disc brake comprises a mounting, a cylinder slidably mounted on the mounting and a pair of disc pads each of which is supported on the mounting. The disc brake comprises a pair of V-shaped springs each of which includes a pair of end portions. One end portion of the V-shaped spring is fit in a hole provided in an outer periphery of one disc pad which is disposed on one side of a disc rotor. The other end portion is fit in a hole provided in an outer periphery of the other disc pad which is disposed on the other side of the disc rotor. The V-shaped springs force outwardly each of the disc pads through the end portions so as to be detached from the disc rotor when the disc brake is releasing.

Because each of the end portions of the V-shaped spring engages with the corresponding disc pad at the radially outer periphery portion thereof, the radially outer periphery portions of the disc pads can be detached from the disc rotor. However radially inner periphery portions of the disc pads sometimes fail to be detached from the disc rotor by the frictional resistance between each of the disc pads and the mounting. Consequently the disc pads remain contacting with the disc rotor under the releasing condition. Therefore the conventional disc brake sometimes applies braking force to the disc rotor in spite of the releasing condition. Furthermore brake judder and noise occur in the disc brake by uneven wear of the disc pads.

SUMMARY OF THE PRESENT INVENTION

It is an object of the present invention to provide an improved disc brake which forces outwardly not only the inner periphery portion but also outer periphery portion of each of the disc pads under the brake releasing condition.

It is another object of the present invention to provide an improved disc brake for use in a vehicle which improves the specific fuel consumption of the vehicle.

It is a further object of the present invention to provide an improved disc brake for use in a vehicle, which prevents the brake judder and noise.

It is further object of the present invention to provide an improved disc brake for use in a vehicle, which is accomplished without the large reconstruction of the conventional disc brake.

It is a further object of the present invention to provide an improved disc brake for use in a vehicle, which is simple in structure and is small in size.

It is a further object of the present invention to provide an improved disc brake for use in a vehicle which is low in cost.

To achieve the above-mentioned objects, the present invention provides a disc brake for use in a vehicle, comprising a mounting member fixable to the vehicle in proximity to the brake disc, a cylinder slidably disposed on the mounting member and a pair disc pads. Each of the disc pads includes a pair of supporting portions and a pair of stepped holes, each of the stepped holes having a larger diameter entry portion leading to a smaller diameter portion, each of the pads being supported on the mounting member at the supporting portions. The spring member engages with each of the pads at a transition between the larger and smaller diameter portions, the transition lying substantially on a line which connects between radial mid-portions of the supporting portions. The spring member fits in the stepped holes and outwardly forces each of the pads so as to be separated from each other.

BRIEF DESCRIPTION OF THE DRAWINGS

The features and advantages of the disc brake for use in a vehicle according to the present invention will be more clearly appreciated from the following description in conjunction with the accompanying drawings wherein.

DETAILED DESCRIPTION OF PREFERRED EMBODIMENT OF THE INVENTION

Figure 1:
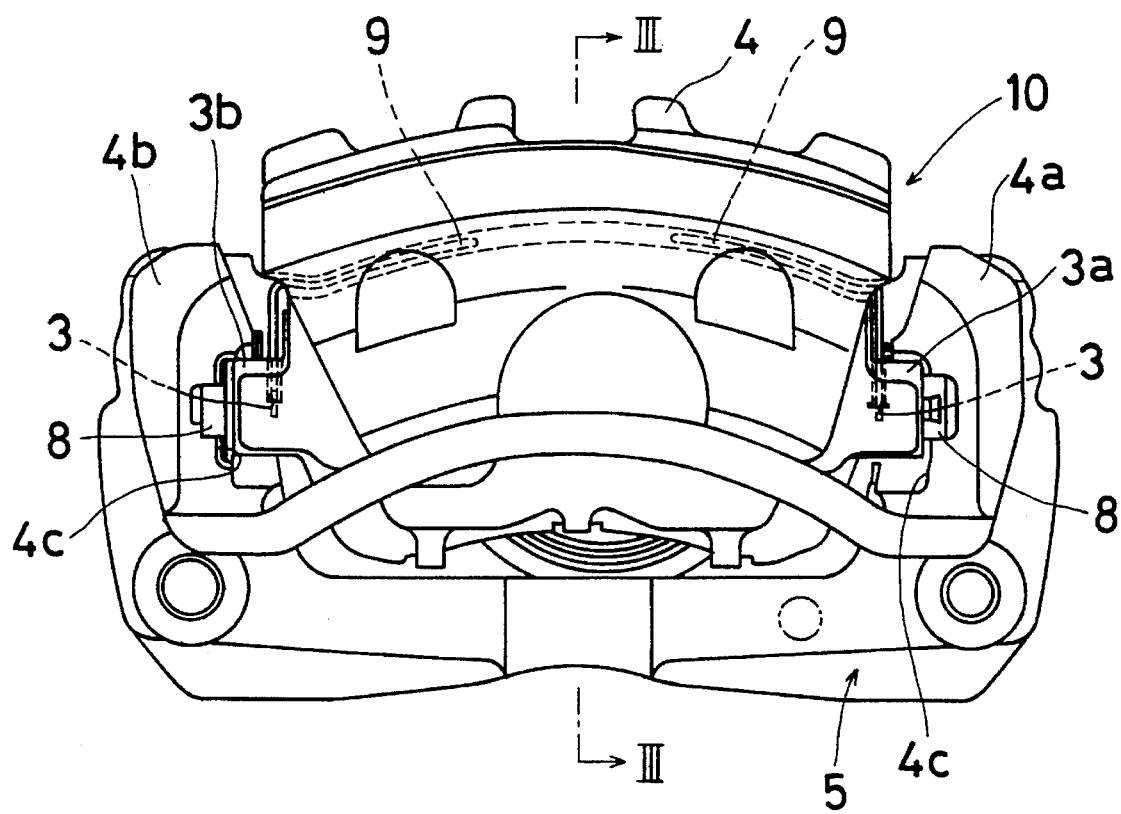
FIG. 1 is a front view of a disc brake for use in a vehicle of the present invention.
Figure 2:
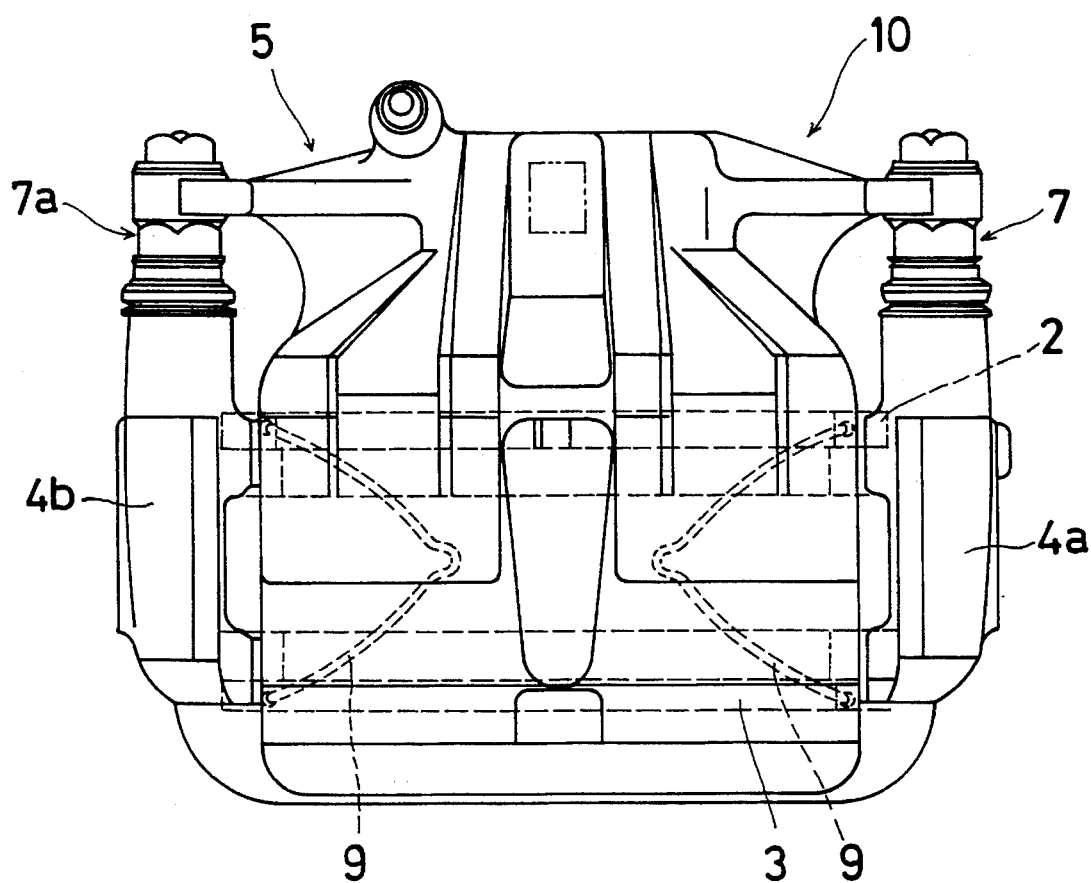
FIG. 2 is a top view of a disc brake for use in a vehicle of the present invention.
Figure 3:
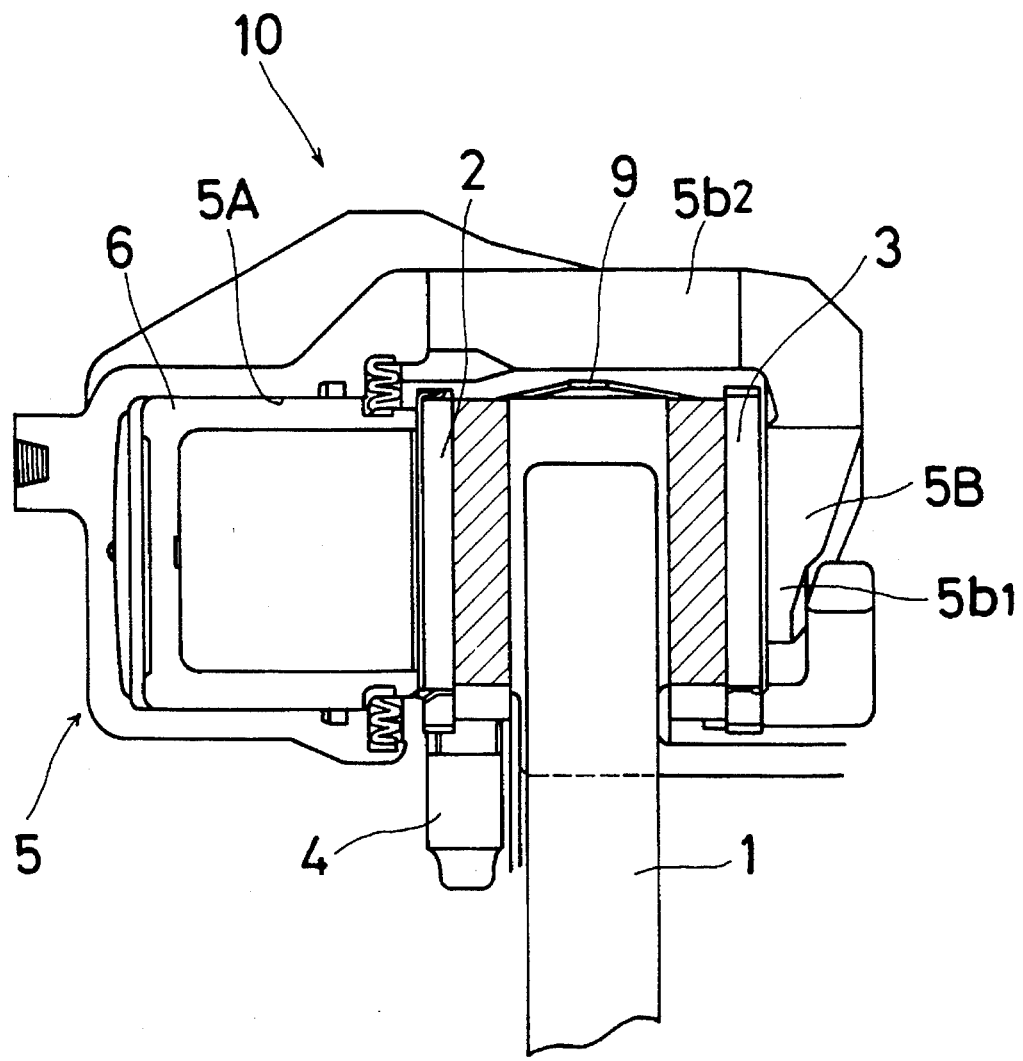
FIG. 3 is a cross-sectional view taken along line III—III of FIG. 1.
Figure 4:
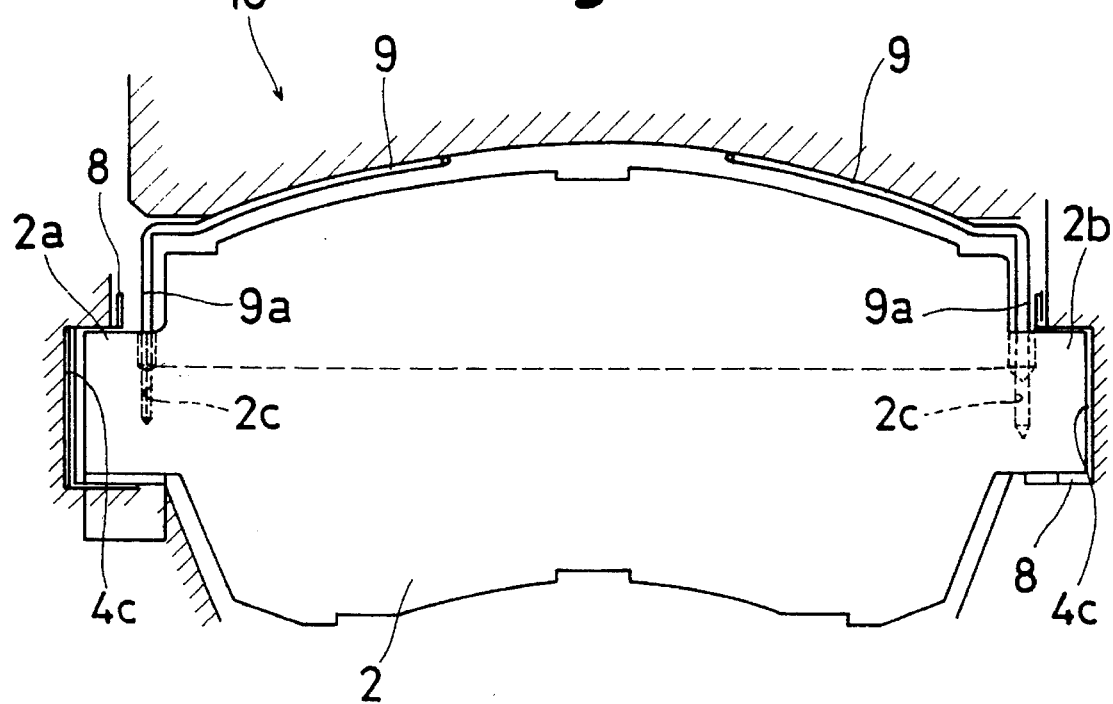
FIG. 4 is a front view of an inner pad which is disposed on a mounting member of a disc brake for use in a vehicle of the present invention.

Referring to FIGS. 1, 2, 3 and 4, a disc brake 10 comprises an inner pad 2, an outer pad 3, a mounting member 4 and a cylinder 5. A disc rotor 1 is fixed on a wheel of a vehicle and rotates with the wheel together. The mounting member 4 is fixed on a suspension of the vehicle and both the inner pad 2 and the outer pad 3 are disposed on the mounting member 4 so as to be able to move in the direction of an axis of the disc rotor 1. The inner pad 2 is disposed at an inner side of the disc rotor 1 and the outer pad 3 is disposed at an outer side of the disc rotor 1. The inner pad 2 includes a pair of projecting portions 2a, 2b which are formed at both side ends of the inner pad 2. Furthermore each of the projecting portions 2a, 2b includes a stepped hole 2c.

The outer pad 3 includes a pair of projecting portions 3a, 3b which are formed at both side ends of the outer pad 3. Each of the projecting portions 3a, 3b includes a stepped hole 3c which is the same as the inner pad 2.

The mounting member 4 includes a pair of arm portions 4a, 4b. Each of the arm portions 4a, 4b comprises a slot 4c. The cylinder 5 is provided on the mounting member 4 through a pair of slide pins 7, 7a so as to be able to slide in the direction of the axis of the disc rotor 1. The cylinder 5 comprises a cylinder portion 5A and a reaction portion 5B. The cylinder portion 5A is disposed at an opposite side of the disc rotor 1 about the inner pad 2. The inner pad 2 contacts with a piston 6 which is inserted in the cylinder portion 5A. The reaction portion 5B comprises a pair of claws 561 and a bridge portion 562. The claws contact with the outer pad 3. The bridge portion 562 extends across the outer periphery of the inner pad 2 and the outer pad 3.

A pair of pad clips 8 support the inner pad 2 and the outer pad 3 on the mounting member 4 in order to prevent the inner pad 2 and the outer pad 3 from juddering and causing noise. Each of the pad clips 8 is disposed between each of the inner pad 2 and the outer pad 3 and the corresponding slot 4c. The pad clips 8 are clamped at the slots 4c. Each of the pad clips 8 is formed of elastic metal which is highly resistant to rust. Both of the inner pad 2 and the outer pad 3 are forced in the upper direction in FIG. 1 by elastic force caused by the pad clips 8. Therefore the inner pad 2 is supported on the mounting member 4 at the upper side (a supporting portion) and the lower side (a supporting portion) of each of the projecting portions 2a, 2b. The outer pad 3 is supported on the mounting member 4 at the upper side (a supporting portion) and the lower side (a supporting portion) of each of the projecting portions 3a, 3b.

Figure 5:
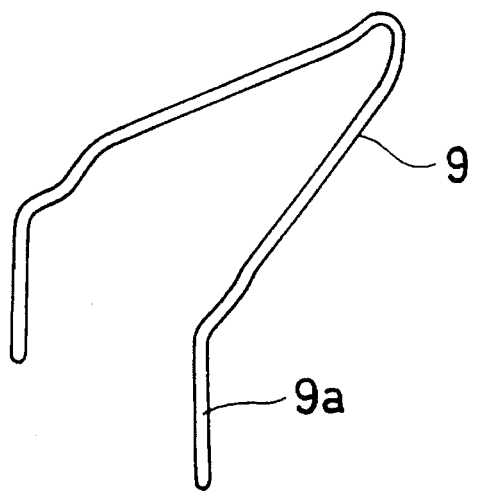
FIG. 5 is a perspective view of a spring member of a disc brake for use in a vehicle of the present invention.

Referring to FIG. 5, a pair of V-shaped springs 9 according to an embodiment of the invention are formed of an elastic wire similar to the prior art. Each of the V-shaped springs 9 includes a pair of engaging portions 9a, each of which is disposed at each of end portions thereof. Each of the engaging portions 9a is inserted into the stepped hole 2c and 3c respectively. The V-shaped springs 9 extend over the disc rotor 1 and are disposed at an inner side of the bridge portion 562. Each of the V-shaped springs 9 engages with the inner pad 2 and the outer pad 3 in such a manner that the V-shaped springs 9 are compressed. Therefore the V-shaped springs 9 force outwardly both the inner pad 2 and the outer pad 3 via the engaging portions 9a so as to be detached from the disc rotor 1. An integral V-shaped spring 9 having four engaging portions 9a may be used in the disc brake according to the invention in stead of a pair of V-shaped springs 9.

Each of the engaging portions 9a of the V-shaped springs 9 engages with the inner pad 2 and the outer pad 3 at portion between the radially upper side (a supporting portion) and the radially lower side (a supporting portion) of each of the projecting portions 2a, 2b, 3a and 3b through the stepped hole 2c and 3c. That is, referring to FIG. 4, each of engaging portions 9a extends radially inward to at least the dash line which connects between the supporting portions. Each of the stepped holes has a larger diameter entry portion leading to a smaller diameter portion at a transition between the two. Therefore the V-shaped spring 9 can force outwardly not only the radially inner periphery portion but also the radially outer periphery portion of each of the inner pad 2 and the outer pad 3. The disc brake prevents the brake drag under the brake releasing condition and improves the specific fuel consumption of the vehicle.

Furthermore the disc brake according to the invention prevents the uneven wear of the pads and the disc rotor. Therefore the disc brake according to the invention prevents the brake judder and noise.

While the invention has been particularly shown and described with reference to preferred embodiment thereof, it will be understood by those skilled in the art that the foregoing and other changes in form and details can be made therein without departing from the spirit and scope of the invention.

What is claimed is:

1. A disc brake for use in a vehicle comprising:
   a mounting member fixable to the vehicle in proximity to a brake disc;
   a cylinder slidably disposed on the mounting member;
   a pair of disc pads, each of which includes a pair of supporting portions and a pair of stepped holes, each of said stepped holes having a larger diameter entry portion leading to a smaller diameter portion, each of the pads being supported on the mounting member at the supporting portions; and
   a spring member which engages with each of the pads at said smaller diameter portion, said smaller diameter portion lying substantially on a line which connects between radial mid-portions of the supporting portions, the spring member fitting in said stepped holes and forcing outwardly each of the pads so as to be separated from each other.

2. A disc brake for use in a vehicle as recited in claim 1, wherein each of the disc pads includes a pair of projecting portions, wherein the supporting portions are disposed at an inner peripheral end and outer peripheral end of each of the projecting portions and wherein the spring member engages with each of the projecting portions.

3. A disc brake for use in a vehicle comprising:
   a mounting member fixable to the vehicle in proximity to a brake disc;
   a cylinder slidably disposed on the mounting member;
   a pair of disc pads, each of which includes a pair of supporting portions extending on opposite ends of the respective disc pads in generally a circumferential direction of the disc and a pair of stepped holes, each of said stepped holes having a larger diameter entry portion leading to a smaller diameter portion, each of the pads being supported on the mounting member at the supporting portions; and
   a pair of spring members, each of which engages with each of the pads at said smaller diameter portion, said smaller diameter portion lying substantially on a line which connects between radial mid-portions of the supporting portions, the spring member fitting in said stepped holes and forcing outwardly each of the pads so as to be separated from each other.

4. A disc brake for use in a vehicle as recited in claim 3, wherein each of the disc pads includes a pair of projecting portions, wherein the supporting portions are disposed at an inner peripheral end and outer peripheral end of each of the projecting portions and wherein the spring members engage with each of the projecting portions.

* * * * *